(12) United States Patent
Yehuda et al.

(10) Patent No.: US 8,966,382 B1
(45) Date of Patent: Feb. 24, 2015

(54) MANAGING PRODUCTION AND REPLICA COPIES DYNAMICALLY

(71) Applicants: Hanna Yehuda, Ra'anana (IL); Ju-Lien Lim, Reading, MA (US)

(72) Inventors: Hanna Yehuda, Ra'anana (IL); Ju-Lien Lim, Reading, MA (US)

(73) Assignees: EMC Corporation, Hopkinton, MA (US); EMC International Company, Hamilton (BM)

( * ) Notice: Subject to any disclaimer, the term of this patent is extended or adjusted under 35 U.S.C. 154(b) by 57 days.

(21) Appl. No.: 13/628,878

(22) Filed: Sep. 27, 2012

(51) Int. Cl.
G06F 3/048 (2013.01)
G06F 3/0484 (2013.01)

(52) U.S. Cl.
CPC .................................... *G06F 3/0484* (2013.01)
USPC ........................................................ 715/762

(58) Field of Classification Search
USPC ........................................................ 715/762
See application file for complete search history.

(56) References Cited

U.S. PATENT DOCUMENTS

| | | | | |
|---|---|---|---|---|
| 6,356,916 B1 * | 3/2002 | Yamatari et al. | ....... | 707/999.201 |
| 6,735,741 B1 * | 5/2004 | Pannu | ......................... | 715/234 |
| 6,957,029 B1 * | 10/2005 | Ozaki | ........................... | 399/182 |
| 7,603,357 B1 * | 10/2009 | Gourdol et al. | ....................... | 1/1 |
| 7,689,597 B1 * | 3/2010 | Bingham et al. | ........... | 707/999.2 |
| 8,238,696 B2 * | 8/2012 | Dart et al. | ..................... | 382/305 |
| 2003/0149709 A1 * | 8/2003 | Banks | ........................... | 707/200 |
| 2004/0230625 A1 * | 11/2004 | Baba et al. | ..................... | 707/204 |
| 2005/0063083 A1 * | 3/2005 | Dart et al. | .......................... | 360/1 |
| 2006/0048014 A1 * | 3/2006 | Takahashi et al. | .............. | 714/44 |
| 2006/0206534 A1 * | 9/2006 | Banks et al. | ..................... | 707/200 |
| 2007/0277010 A1 * | 11/2007 | Anand et al. | .................. | 711/162 |
| 2007/0294319 A1 * | 12/2007 | Mankad et al. | ............... | 707/204 |
| 2008/0178041 A1 * | 7/2008 | Takahashi et al. | ................ | 714/6 |
| 2008/0256314 A1 * | 10/2008 | Anand et al. | .................. | 711/162 |
| 2010/0223232 A1 * | 9/2010 | Wakefield | ..................... | 707/634 |
| 2011/0145526 A1 * | 6/2011 | Parham et al. | ................ | 711/162 |
| 2012/0243395 A1 * | 9/2012 | Farey | .............................. | 369/84 |
| 2013/0054529 A1 * | 2/2013 | Wang et al. | ................... | 707/639 |

* cited by examiner

Primary Examiner — Kieu Vu
Assistant Examiner — Alvaro R Calderon, IV
(74) Attorney, Agent, or Firm — Daly, Crowley, Mofford & Durkee, LLP

(57) ABSTRACT

In one aspect, a method includes rendering a user interface enabling a user to dynamically configure a production copy and a replica of the production copy. The user interface further enables a user to dynamically configure a replica of a replica copy. The method also includes receiving a first set of inputs selected by a user using the user interface to configure the production copy, receiving a second set of inputs selected by the user using the user interface to configure the replica copy and configuring a data protection system to replicate the production copy at the replica based on the first and second set of inputs.

20 Claims, 22 Drawing Sheets

Select Volume

Production Volume Summary

| Array Vendor | Array Type | Array Serial # | Volume Name | Volume UID | Size (GB) |
|---|---|---|---|---|---|
| DGC | CX | 101 | VOL ID: 0004 | 57, 69, 72, 23, 31, 34, 30 | 78.3 |

Select replica copy volume:

| ☐ All | ☐ All | ☐ All | ☐ All | ☐ All | ☐ All |
|---|---|---|---|---|---|
| Array Vendor | Array Type | Array Serial # | Volume Name | Volume UID | Size (GB) |
| DGC | CX | 101 | VOL ID: 0010 | 57, 69, 74, 25, 32, 10, 30 | 128.0 |
| DGC | CX | 101 | VOL ID: 0011 | 57, 69, 74, 25, 32, 11, 30 | 128.0 |
| DGC | CX | 101 | VOL ID: 0012 | 57, 69, 74, 25, 32, 12, 30 | 128.0 |
| DGC | CX | 101 | VOL ID: 0013 | 57, 69, 74, 25, 32, 13, 30 | 128.0 |
| DGC | CX | 101 | VOL ID: 0020 | 57, 69, 87, 11, 21, 32, 30 | 256.0 |
| DGC | CX | 101 | VOL ID: 0021 | 57, 69, 87, 11, 21, 32, 30 | 86.5 |
| DGC | CX | 101 | VOL ID: 0022 | 57, 69, 87, 11, 21, 33, 30 | 86.5 |

1 Selected    Unfiltered: 180 items

OK   Cancel   Help

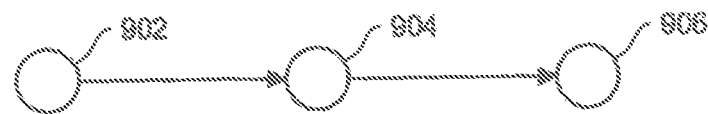
FIG. 9A
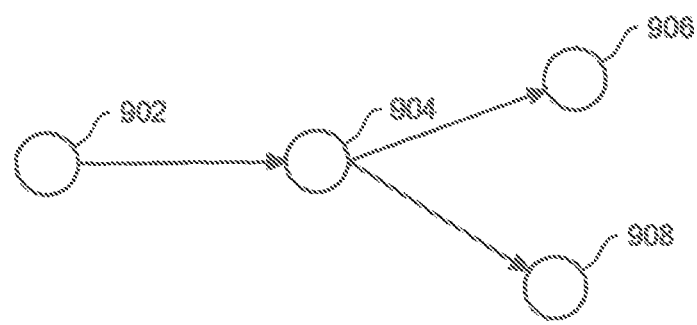
FIG. 9B
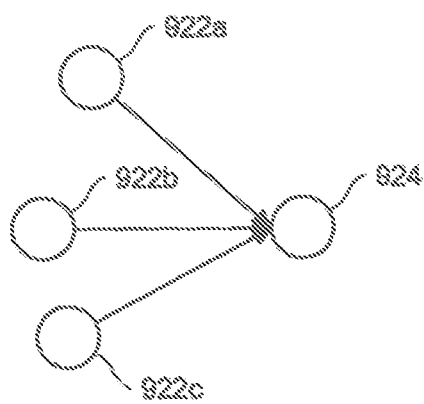      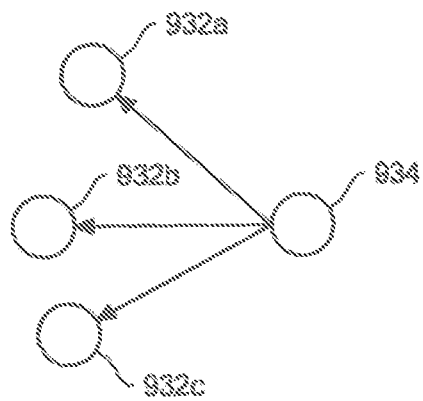
FIG. 9C                    FIG. 9D

US 8,966,382 B1

MANAGING PRODUCTION AND REPLICA COPIES DYNAMICALLY

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the production system. During a recovery, the journal entries serve as successive "undo" information, enabling roll back of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In one aspect, a method includes rendering a user interface enabling a user to dynamically configure a production copy and a replica of the production copy. The user interface further enables a user to dynamically configure a replica of a replica copy. The method also includes receiving a first set of inputs selected by a user using the user interface to configure the production copy, receiving a second set of inputs selected by the user using the user interface to configure the replica copy and configuring a data protection system to replicate the production copy at the replica based on the first and second set of inputs.

In another aspect, an article includes a non-transitory machine-readable medium that stores executable instructions. The instructions cause a machine to render a user interface enabling a user to dynamically configure a production copy and a replica of the production copy. The user interface further enables a user to dynamically configure a replica of a replica copy. The instructions also cause the machine to receive a first set of inputs selected by a user using the user interface to configure the production copy, receive a second set of inputs selected by the user using the user interface to configure the replica copy and configure a data protection system to replicate the production copy at the replica based on the first and second set of inputs.

In a further aspect, an apparatus includes electronic hardware circuitry, the circuitry configured to render a user interface enabling a user to dynamically configure production volumes and replicas of the production volumes. The user interface further enables a user to dynamically configure a replica of a replica of production volumes. The circuitry is also configured to receive a first set of inputs selected by a user using the user interface to configure production volumes, receive a second set of inputs selected by the user using the user interface to configure a replicas and configure a data protection system to replicate the production volumes at the replica based on the first and second set of inputs.

BRIEF DESCRIPTION OF THE DRAWINGS

FIGS. 4A to 4E are examples of screenshot used with the process in FIG. 3.

FIGS. 6A to 6H are examples of screenshots used with process of FIG. 5.

FIGS. 8A to 8D are examples of screenshots used with the process of FIG. 7

FIGS. 9A to 9D are diagrams of examples of configurations that can be generated using the process of FIG. 3.

DETAILED DESCRIPTION

Figure 1:
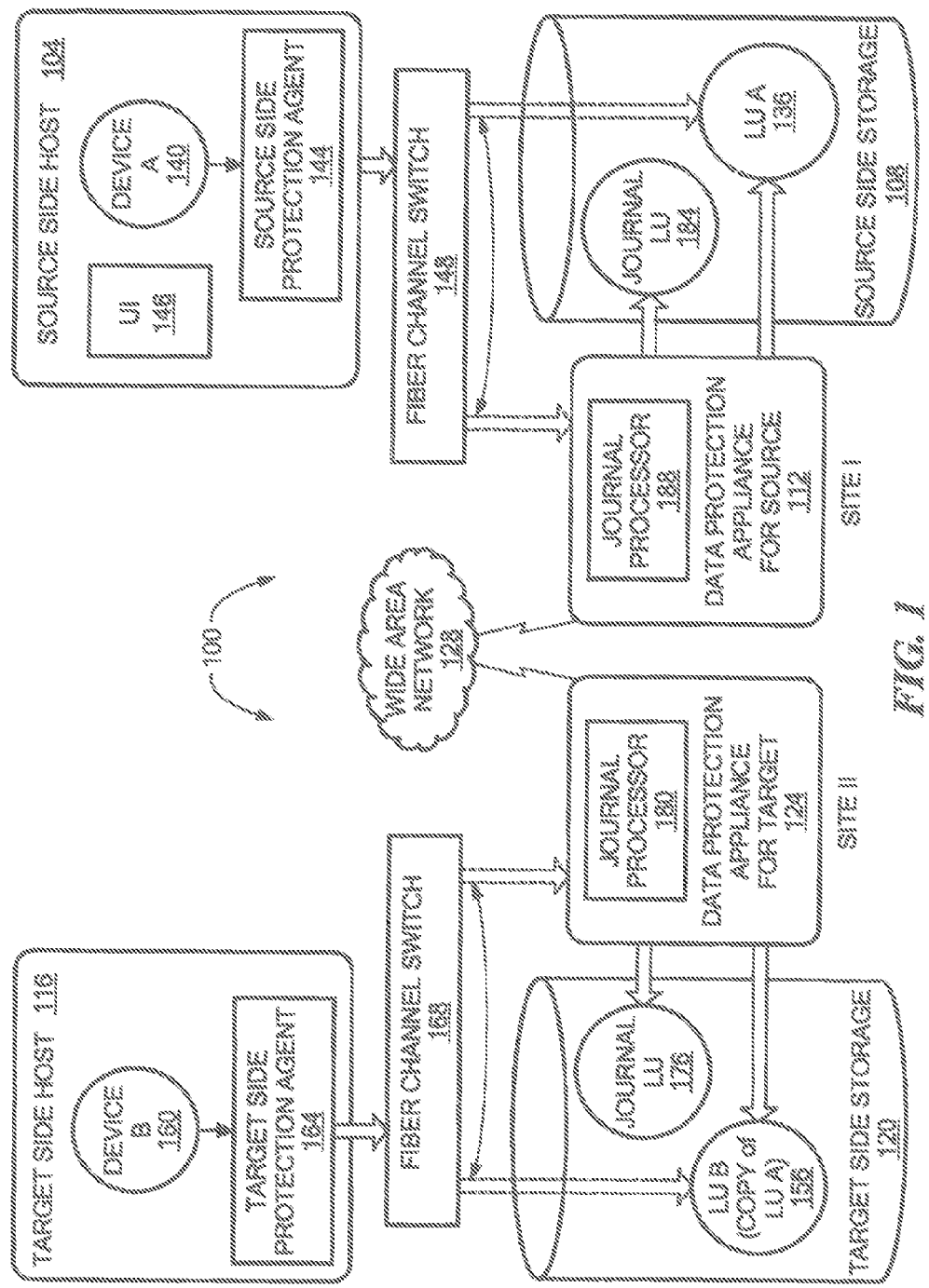
FIG. 1 is a block diagram of an example of a data protection system.

Described herein is a mechanism (e.g., a user interface 146) to dynamically manage the data protection topology configuration using a visual representation of a topology map for guidance. Specifically, a user can manage (e.g., add, delete, edit) production copy and a replica of the production copy (also referred herein as a replica copy) and their underlying protection topology configuration. In other examples, the user can manage links between the copies (e.g., between a production copy and a replica copy), and their underlying policies, at anytime using a topology map that shows the connections between copies and its underlying components as well as status, transfer, and various other relevant data protection information. As used herein a copy can include a production copy or a replica copy, i.e., local or remote copy. A copy is a logical entity that constitutes all of the volumes defined for a data protection configuration at a given location. Some examples include production, local, and/or remote copies. The production copy includes production volumes and the production journal volume(s). The non-production or replica copies include replica volumes and a replica journal volume(s).

Each copy is typically associated with a location or site, which includes managed objects such as a data protection appliance, storage array and splitter (array, SAN switch, and/ or host). The techniques described herein reduce configuration time and allows the user to more easily manage changes to the protection topology, change copies (e.g., change the production copy to a replica copy), add/delete/edit replica copies and their underlying policies and configurations while using a visualization cue, as well as understand where the user is in the process of defining the data protection topology and the configuration flow. For example, the techniques described herein reduce mistakes when changes to any one of the copies (production copy or replica copy) are made. Since the user interface may be a visual interface, the user is provided with a visual representation of target copy that user selects to change; thus reducing chances for mistake.

The following definitions may be useful in understanding the specification and claims.

BACKUP SITE—a facility where replicated production site data is stored; the backup site may be located in a remote site or at the same location as the production site;

CG—CONSISTENCY GROUP—a set of logical units (LUs) which are replicated together for which write order fidelity is preserved;

GRID COPY—another name for an internal consistency group, a grid copy is a unit of replication which runs on a single replication appliance and replicates part of consistency group data;

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request which may be a read I/O request (read request) or a write I/O request (write request), also referred to as an I/O;

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal);

SPLITTER ACKNOWLEDGEMENT—an acknowledgement from a DPA to a data protection agent (splitter) that data has been received at the DPA; this may be achieved by a SCSI status command;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

An Example of a Replication System

Referring to FIG. 1, a data protection system 100 includes two sites; Site I, which is a production site, and Site II, which is a backup or replica site. Under normal operation the production site is the source side of system 100, and the backup site is the target side of the system. The backup site is responsible for replicating production site data. Additionally, the backup site enables roll back of Site I data to an earlier point-in-time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage of being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer (source-side host) 104, a source storage system 108, and a source DPA 112. Similarly, the target side SAN includes a target host computer 116, a target storage system 120, and a target DPA 124. As well, the data protection agent (splitter) may run on the host, or on the storage, or in the network, and that DPAs are optional and DPA code may run on the storage array too.

The host 104 includes a user interface 146. As will be further described herein the UI 146 allows a user to configure the system 100, for example, by managing production and replica volumes.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fibre channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fibre channels using, for example, SCSI commands.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 may include data protection agents 144 and 164, respectively. Data protection agents 144 and 164 intercept SCSI commands issued by their respective host computers, via host devices to logical units that are accessible to the host computers. A data protection agent (also referred to herein as a splitter or simply as a protection agent) may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A data protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A data protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fibre channel, or SCSI over fibre channel, as well as iSCSI. The communication may be direct, or via a logical unit exposed by the DPA. Protection agents communicate with their respective DPAs by sending SCSI commands over fibre channel.

Protection agents 144 and 164 are drivers located in their respective host computers 104 and 116. Alternatively, a protection agent may also be located in a fibre channel switch, or in any other device situated in a data path between a host computer and a storage system or on the storage system itself.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B updates the journal entries in the journal LU with undo information, applies the journal transactions to LU B, and removes already-applied transactions from the journal.

Figure 2:
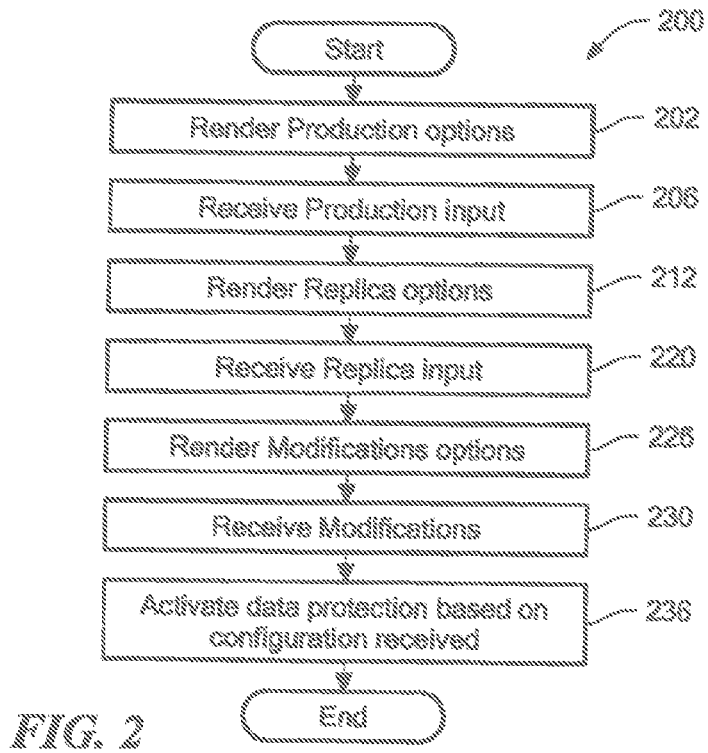
FIG. 2 is a flowchart of an example of a process to manage production and replica volumes dynamically.

Referring to FIG. 2, an example of a process to manage production and replica copies dynamically is a process 200. Process 200 renders production options (202) to a user and receives production input provided by the user (206). Process 200 renders replica options (212) to a user and receives replica input provided by the user (220). Process 200 renders modification options (226) to a user and receives modifications provided by the user (230). Process 200 activates data protection based on the configuration received from the user (236). For example, the configuration includes the production and replica inputs and any modifications provided.

Figure 3:
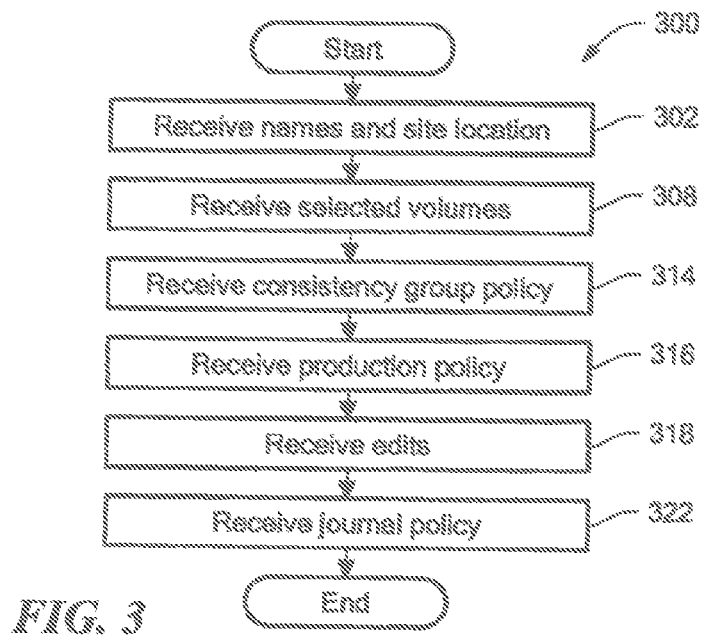
FIG. 3 is a flowchart of an example of a process to render and receive production input.

Referring to FIG. 3, an example of a process to receive production inputs is a process 300. Process 300 receives, from a user, a name of the volumes and a name of consistency group and a site location (302). For example, a user provides a name of the consistency group, a name of the production volumes and a selection of a production site where the production volumes are located.

Process 300 receives selected volumes (308). For example, a user selects volumes to include as part of the production volumes.

Process 300 receives a consistency group policy (314) and receives a production policy (316). For example, the user selects parameters for the consistency group policy and parameters for the production policy.

Process 300 receives edits (318). For example, a user is allowed an opportunity to review the production volumes and make any edits.

Process 300 receives a journal policy (322). For example, the user selects parameters for the journal policy.

Figure 4A:
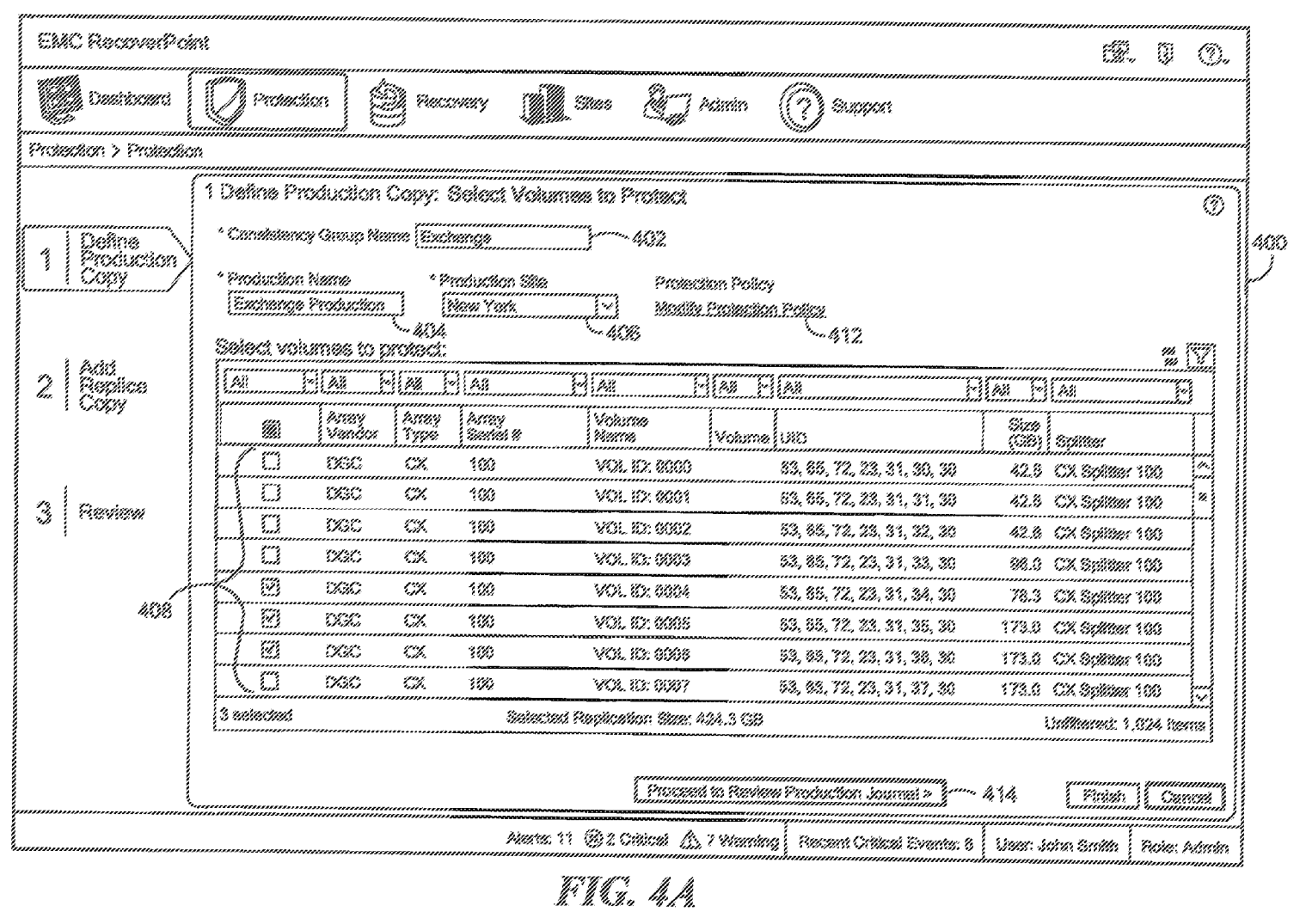

Referring to FIGS. 4A, an example of a graphical user interface rendered to a user to provide production inputs in processing blocks 302, 308 is a window 400. The window 400 includes a consistency group name input 402 which allows a user to type in the name of the consistency group using a keyboard, for example. The window 400 also includes a production name input 404 which allows a user to type in the name of the production volumes using a keyboard, for example.

The window 400 further includes a production site input 406 which allows a user to use a drop down menu to select a production site name using a mouse, for example. The window 400 also includes a volume selection input 408 which allows a user to select volumes using check boxes using a mouse, for example.

The window 400 also includes a modify protection policy hypertext 412 that allows a user to modify a consistency group policy and a protection policy. The window 400 further includes a "Process to review Production Journal" button 414 which allows the user to review the production journal.

Figure 4B:
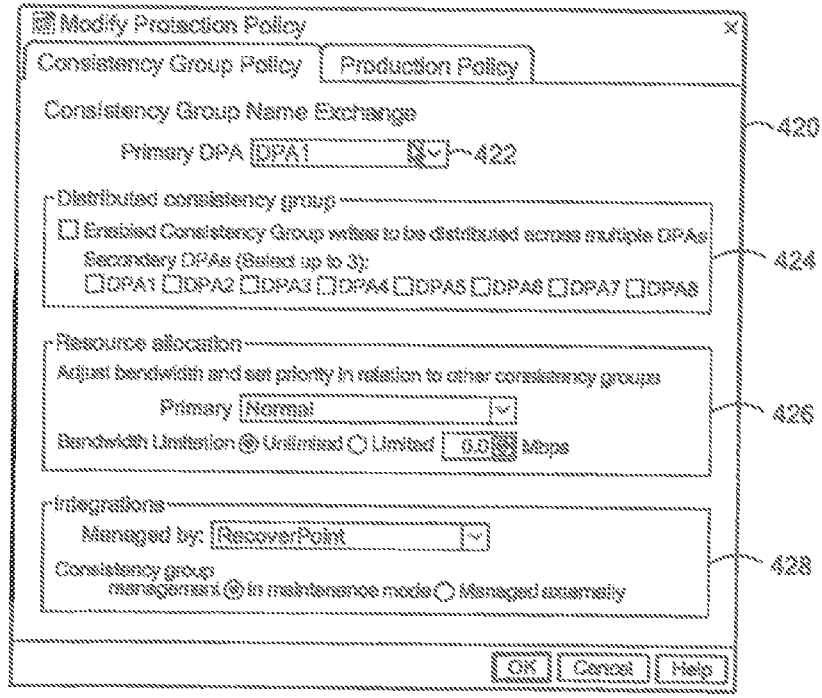
Figure 4C:
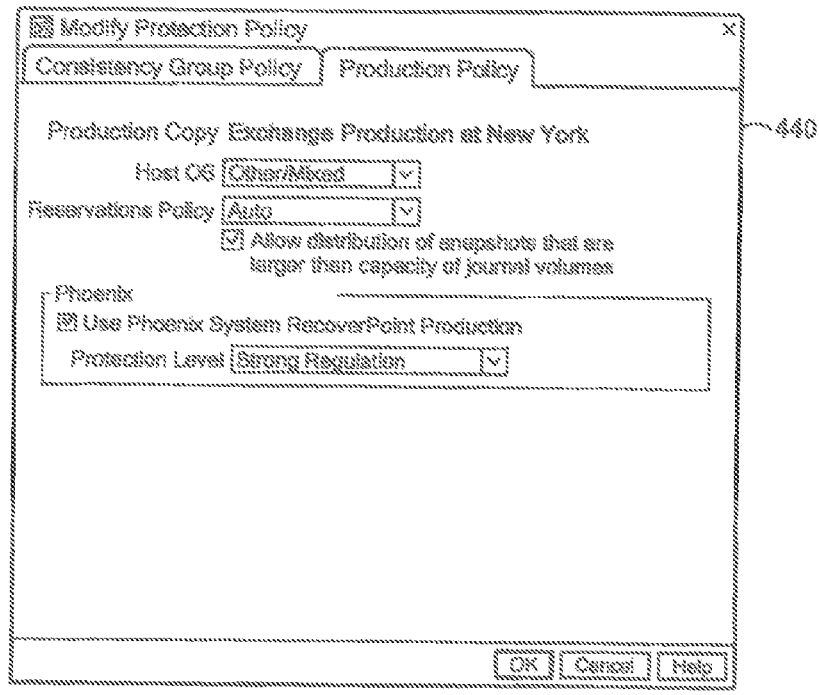

Referring to FIGS. 4B and 4C, when the user activates the modify protection policy hypertext 412 (FIG. 4A), for example using a mouse, a user is allowed access to a consistency group policy window 420 to provide consistency group policy input (processing block 314 in FIG. 3) and a production policy window 440 to provide production policy inputs (processing block 316 in FIG. 3). The consistency group policy window 420 includes a drop down menu 422 to allow a user to designate a primary DPA in a cluster of DPAs. The consistency group policy window 420 also includes a distributed consistency group section 424, a resource allocation section 426 and an integrations section 428. The distributed consistency group section 424 allows a user to choose to enable consistency group writes to be distributed across multiple DPAs. The resource allocation section 426 allows a user to adjust the bandwidth and set a priority in relation to other consistency groups. The integrations section 428 allows a user to designate how the consistency group is managed.

Figure 4D:
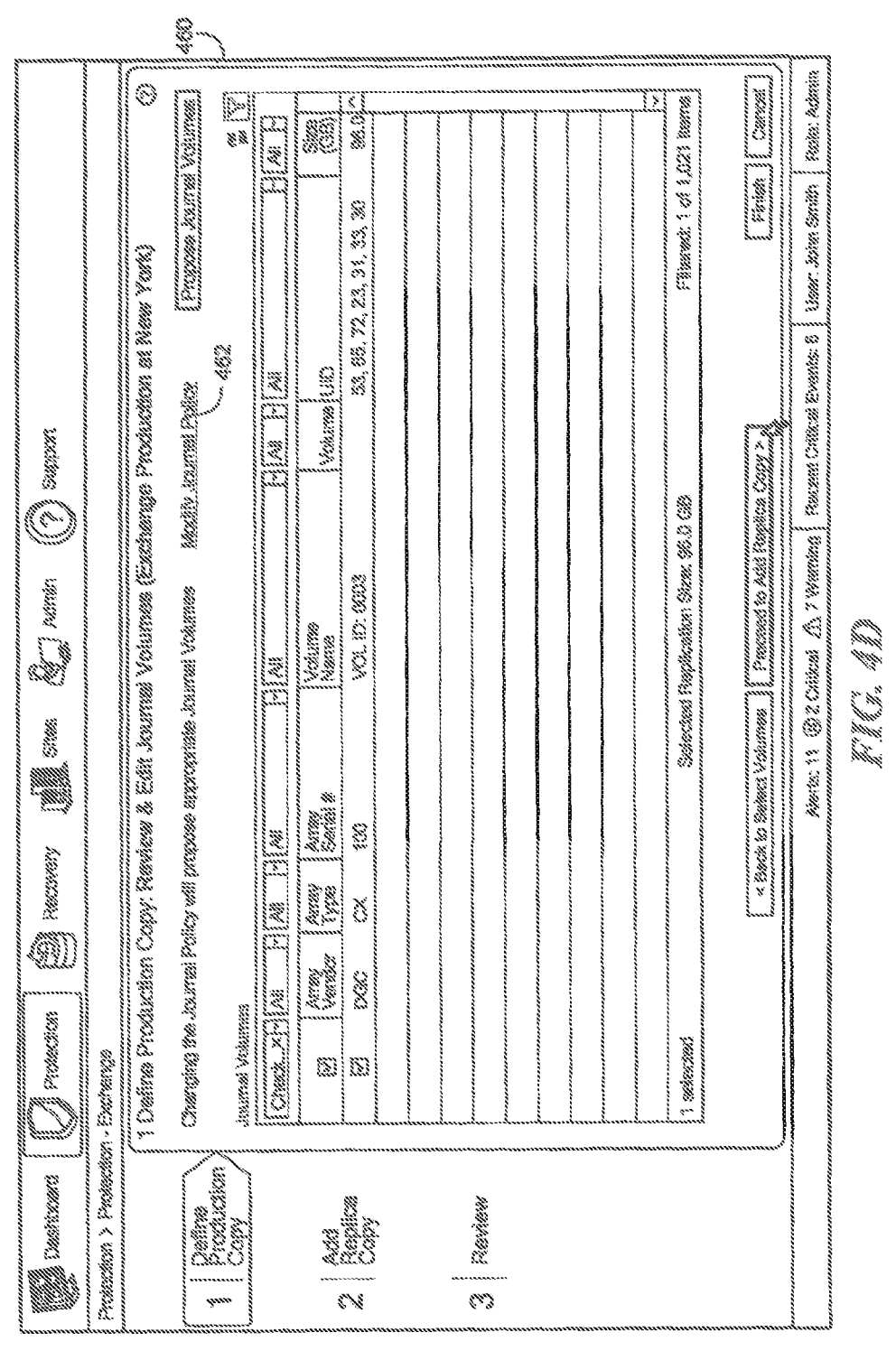
Figure 4E:
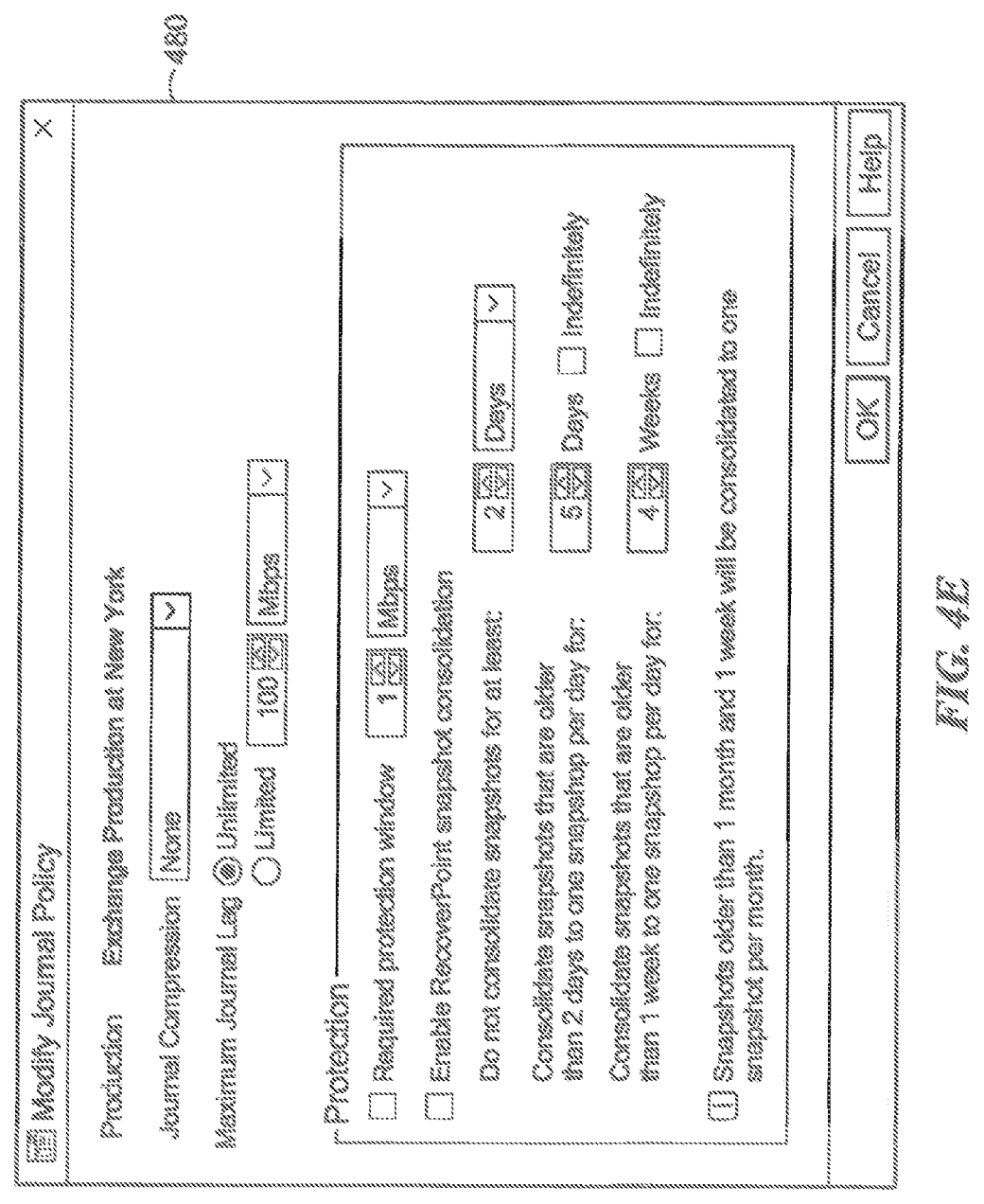

Referring to FIGS. 4D and 4E, when the user activates the "Process to review Production Journal" button 414, the user is provided access to a window 460 which allows the user to review and edit journal volumes. The window 460 includes a modify journal policy hypertext 462. When the user activates the modify journal policy hypertext 462, for example, using a mouse, the user is allowed access to a window 480 which allows the user to modify the journal policy.

Figure 5:
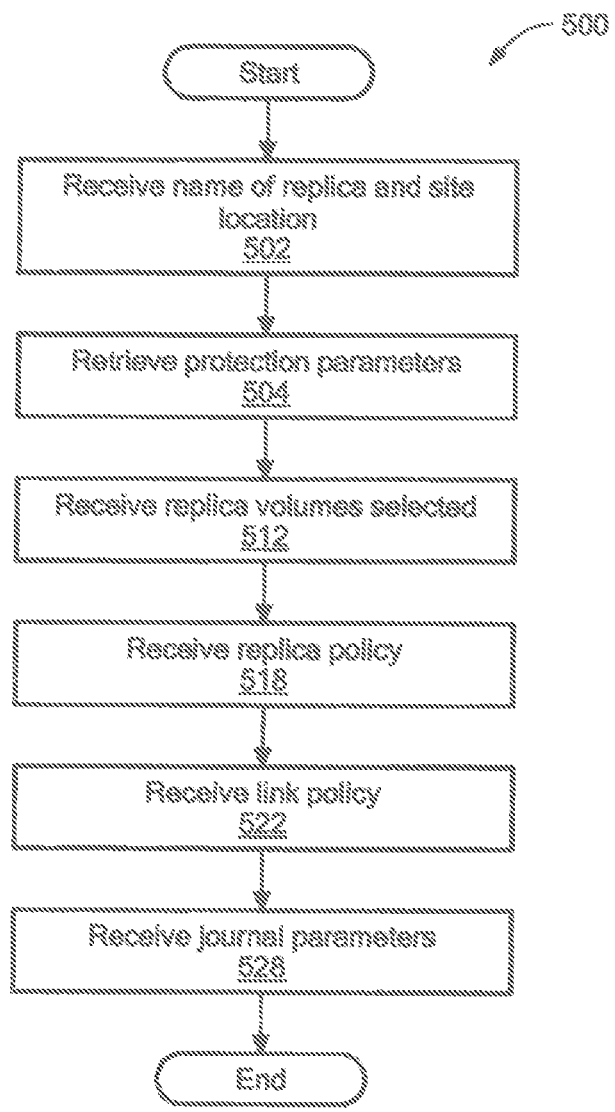
FIG. 5 is a flowchart of an example of a process to receive replica input.

Referring to FIG. 5, an example of a process to receive replica inputs is a process 500. Process 500 receives, from a user, a name of the replica and a site location (502). For example, a user provides a name of the replica copy and a selection of a replica site where the replica copy is located.

Process 500 receives protection parameters (504). For example, a user selects a recovery point objective (RPO) and a protection type.

Process 500 receives replica volumes selected (512). For example, the user selects replica volumes to be matching automatically or selecting them manually.

Process 500 receives a replica policy (518) and receives a link policy (522). For example, a user reviews and modifies the replica policy and the link policy.

Process 500 receives journal parameters (528). For example, the user selects parameters for the journal policy.

Referring to FIG. 6, an example of a graphical user interface rendered to a user to provide production inputs in processing blocks 502, 504 is a window 600a. The window 600a includes a consistency group name input 602 which allows a user to type in the name of the consistency group using a keyboard, for example.

The window 600a also includes a replica site input 604 which allows a user to use a drop down menu to select a replica site name using a mouse, for example. The window 600a further includes an RPO section enabling the user to select the RPO, for example, system optimized lag or a maximum lag setting based on user entered value in bytes, kilobytes, Megabytes, Gigabytes, writes, seconds, minutes, or hours. The window 600a also includes a protection type section allowing a user to choose between asynchronous or synchronous protection.

The window 600a still further includes a replica & link policy hypertext 610 to allow the user to modify the replica and or the link policy, a match volumes automatically hypertext 612 to allow the user to choose which volume to match automatically and a selected volumes hypertexts 616 that allows a user to manual match the replica volumes.

Figure 6A:
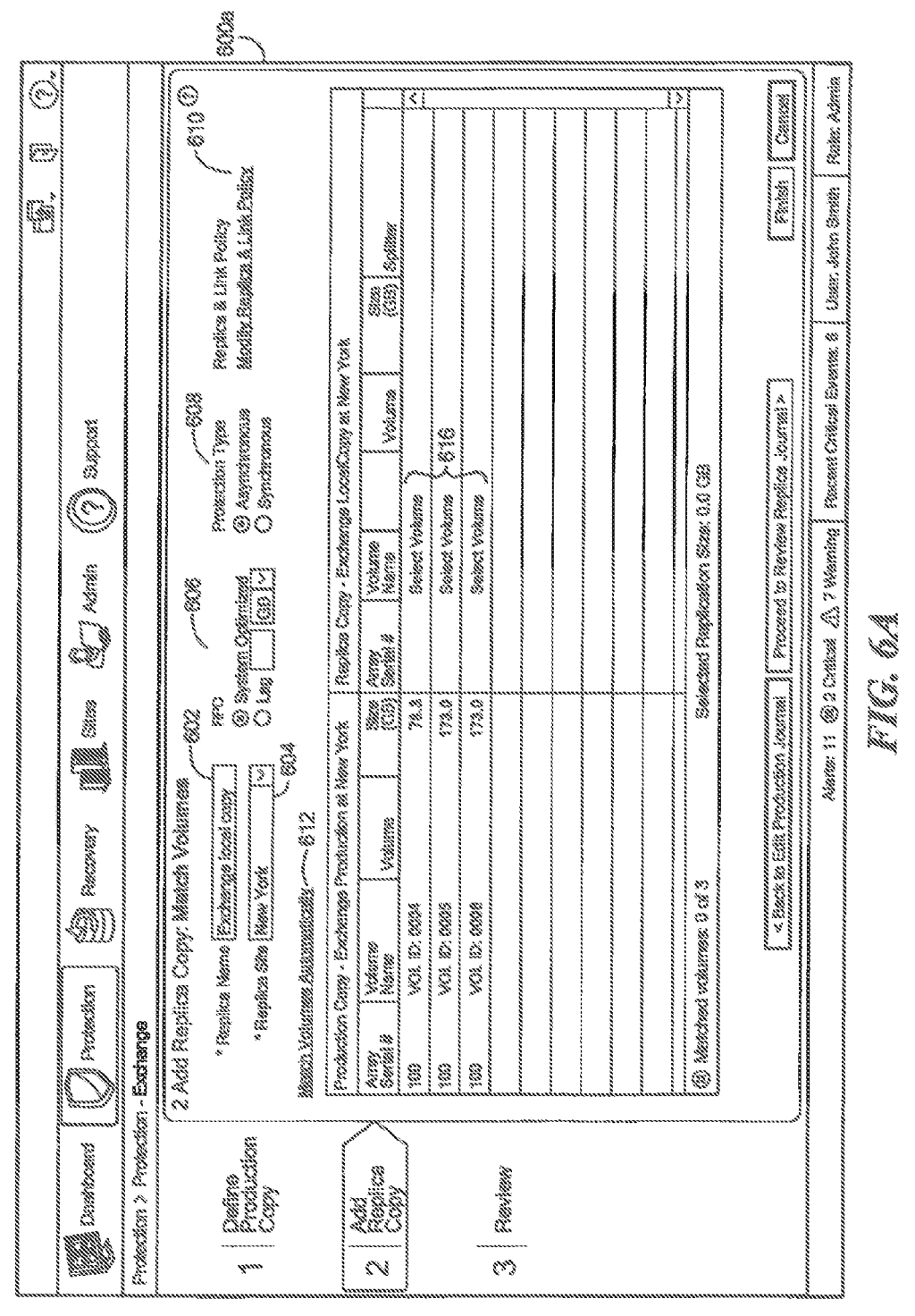
Figure 6B:
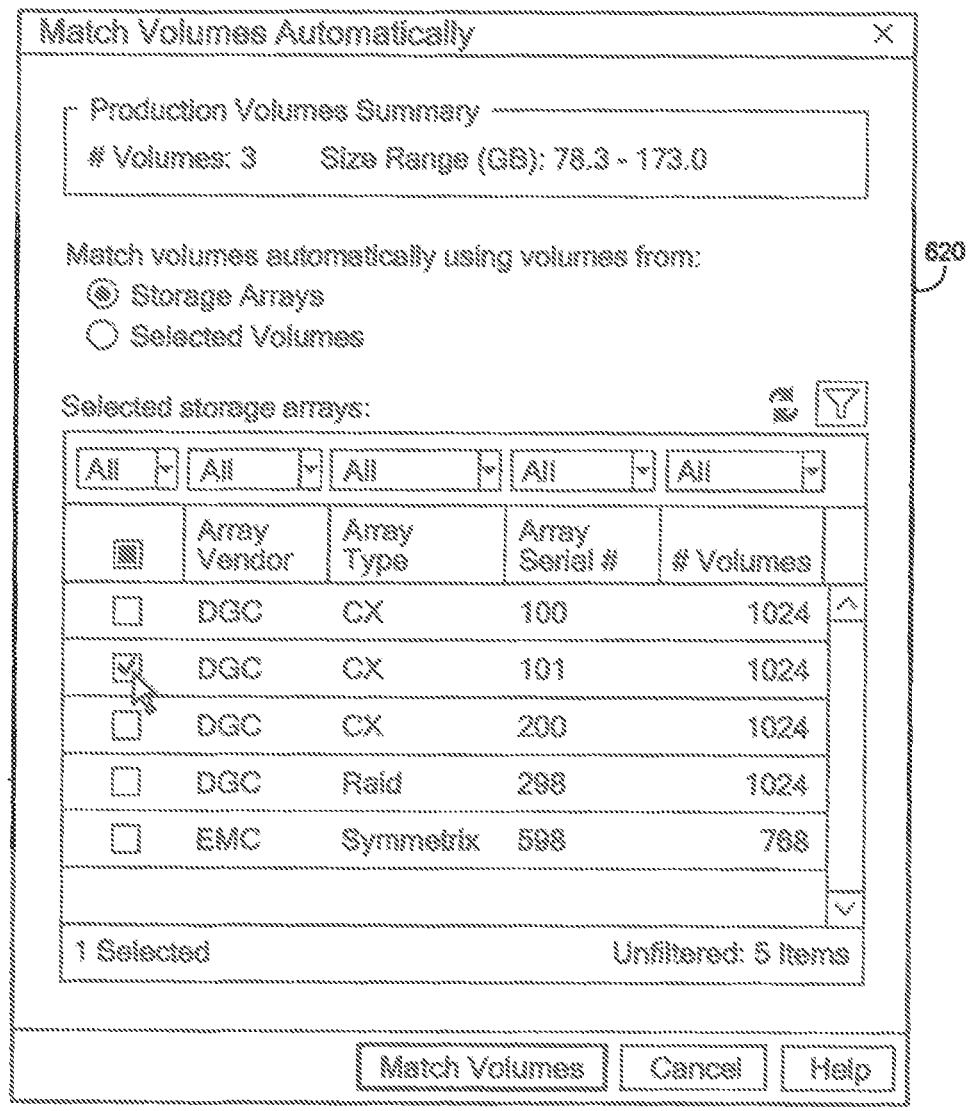

Referring to FIG. 6B, when the user activates the match volumes automatically hypertext 612 the user has access to the window 620. The window 620 allows the user to select which volumes to match automatically, as well as perform volume match overrides.

Figure 6C:
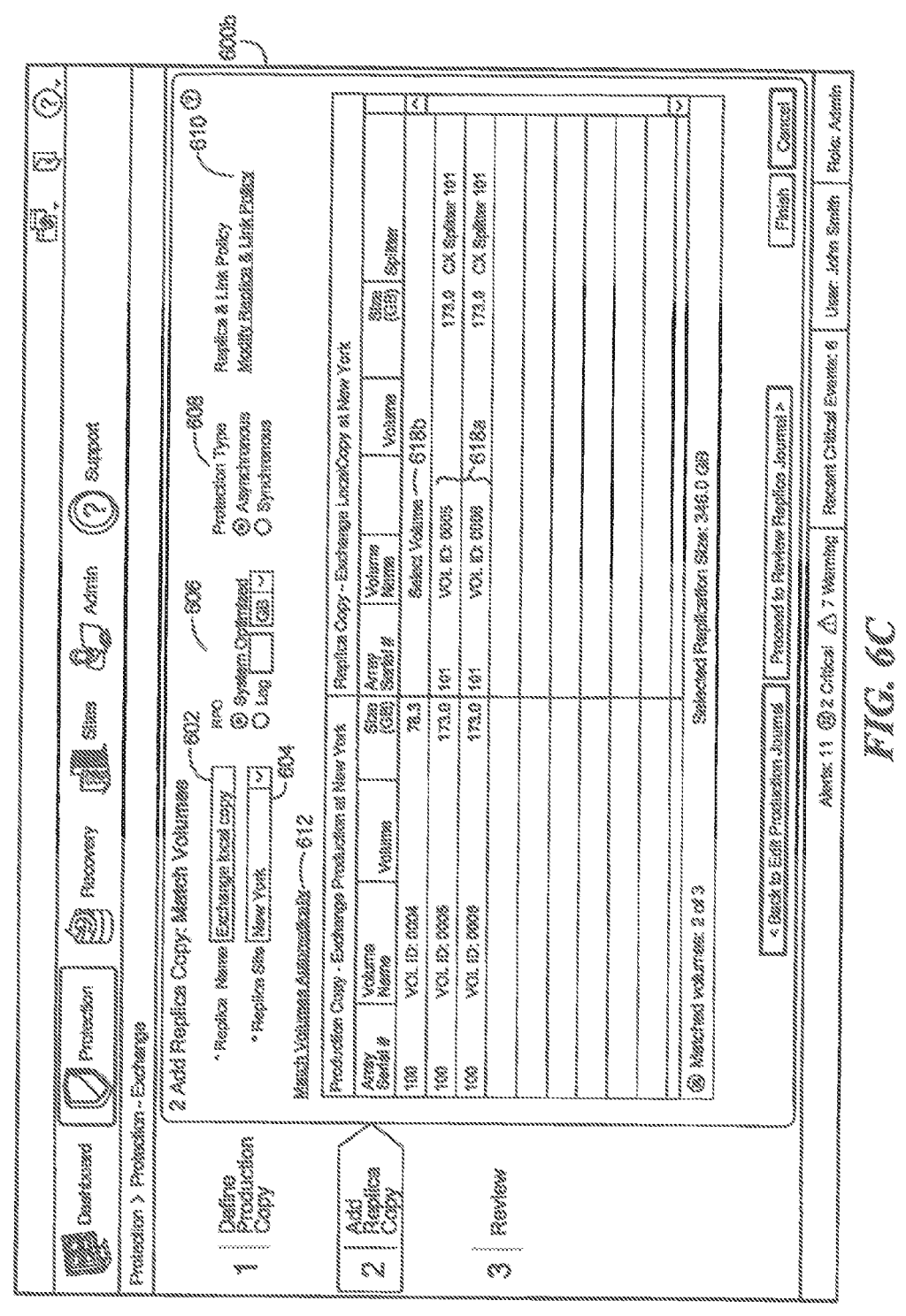

Referring to FIG. 6C, a window 600b is the same as window 600a except two replica volumes have been selected (using the window 620) have matched automatically while one volume has not been selected to match automatically. In particular, the selected volume hypertexts 616 have been removed for two volumes and replaced with volume names 618a that have been matched automatically. The remaining volume that is not selected still includes a select volume hypertext 618b.

Referring to FIG. 6D, when the selected volume hypertext is selected from window 600b or any of the selected volume hypertexts 616 from window 600a, the user is given access to the window 640, which allows user to manually selected replica volumes.

Figure 6E:
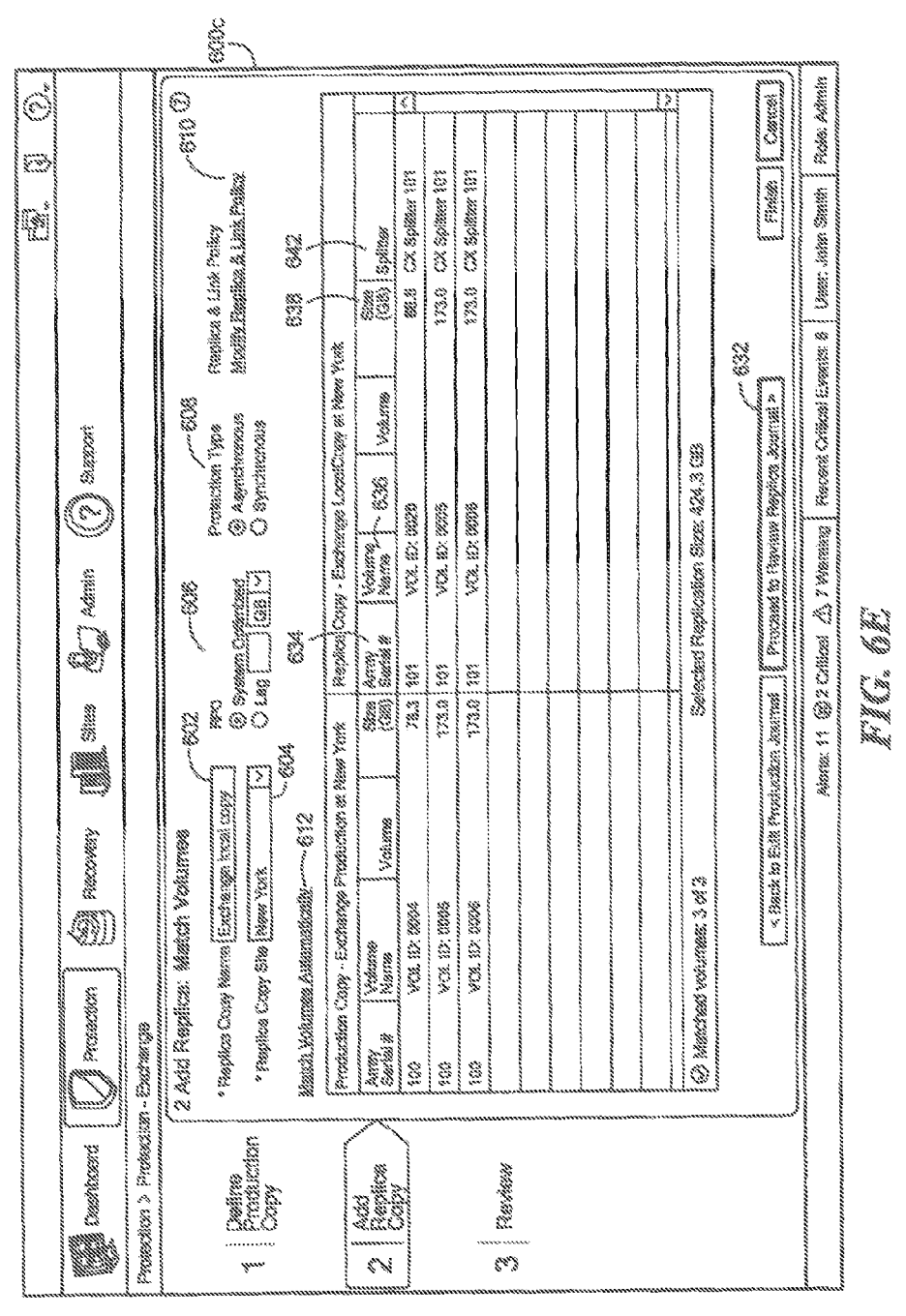

Referring to FIG. 6E, a window 600c is the same as the window 600a except an array serial number column 634, a volume name column 636, a size column 638 and a splitter column 642 are now filled in for the replica volumes. In addition, since all of the replica volumes have been determined, a "proceed to review replica journal" button 632 becomes available to the user to activate. For example, in windows 600a, 600b the window was merely shaded and not accessible to the user.

Figure 6F:
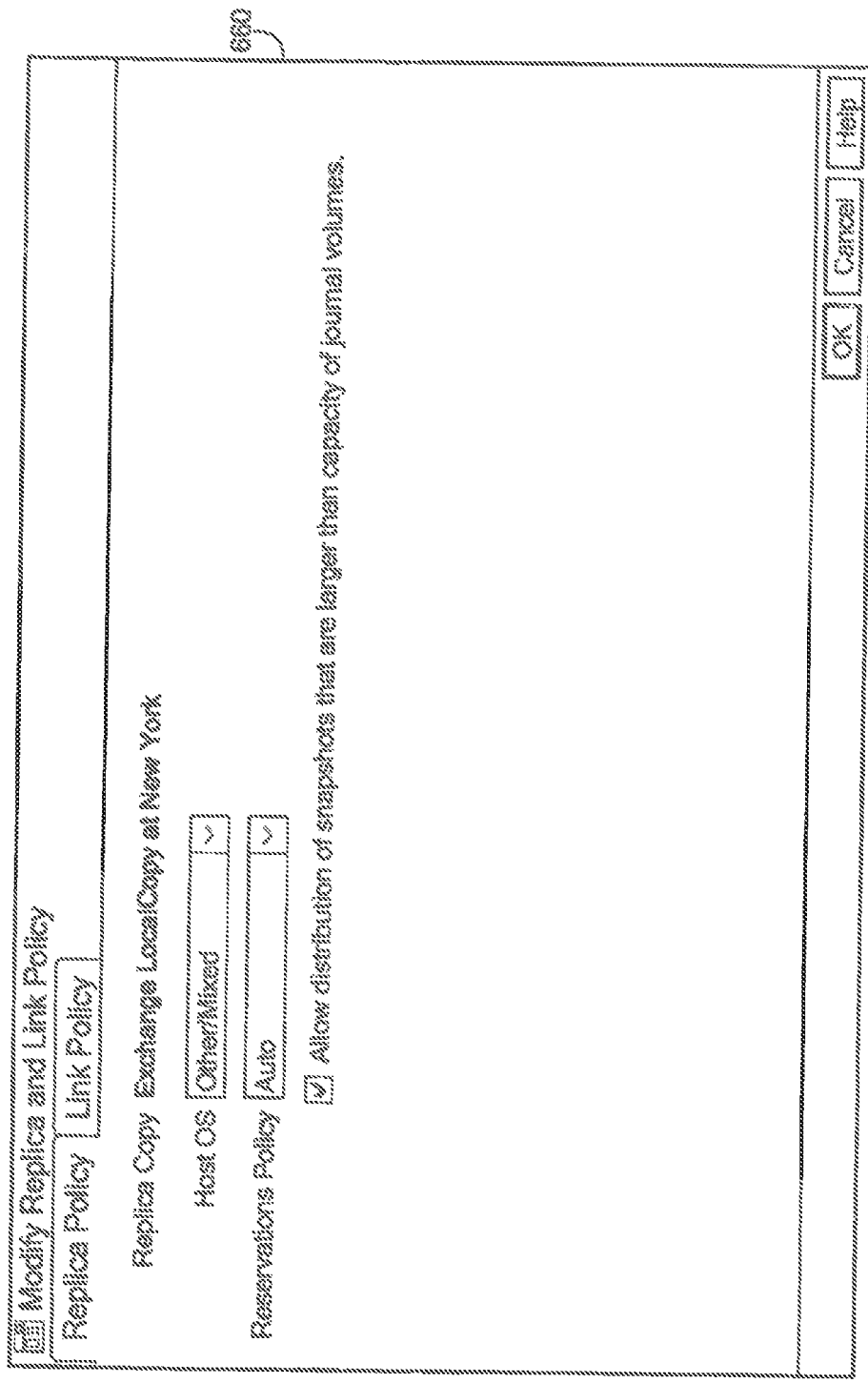
Figure 6G:
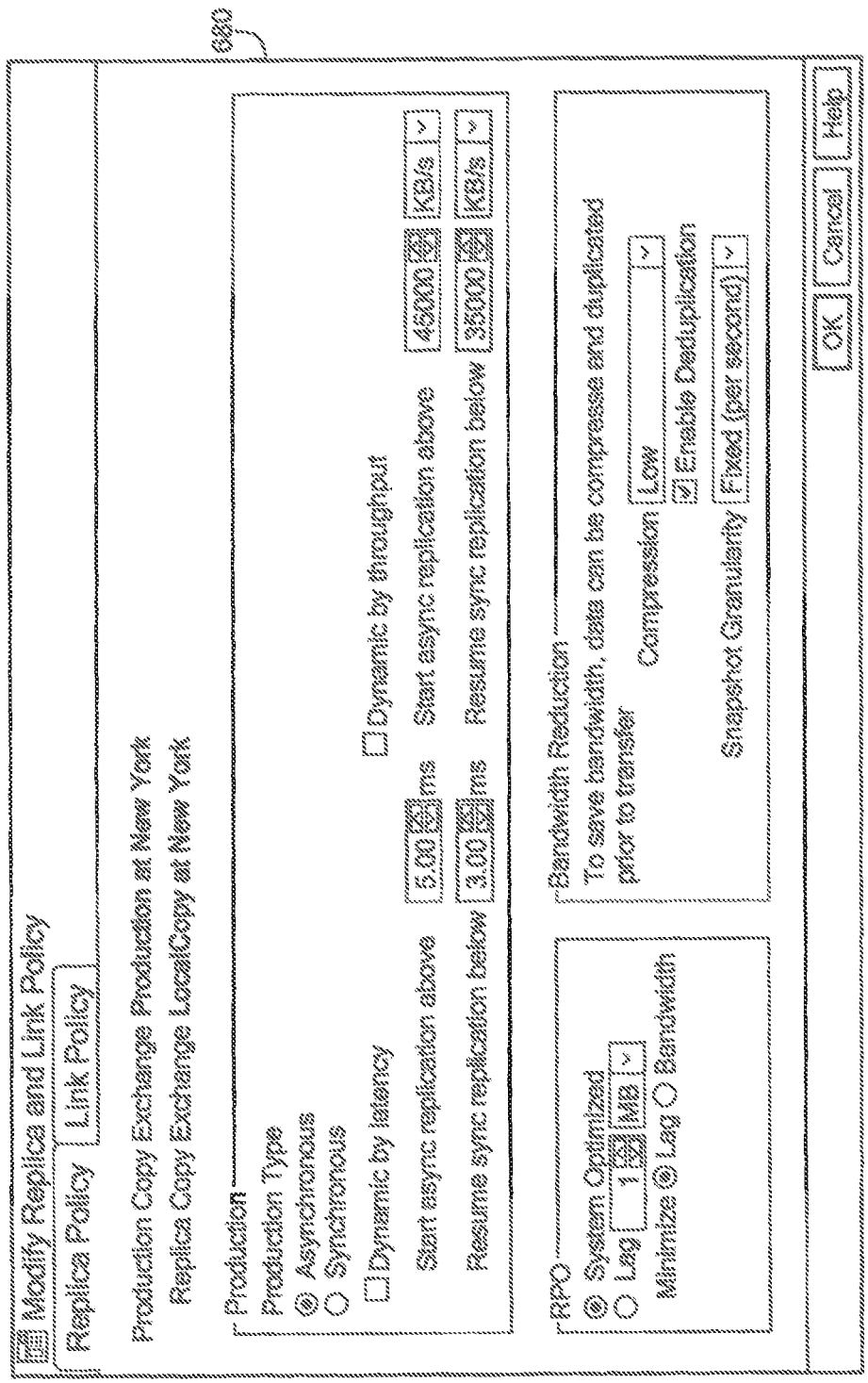

Referring to FIGS. 6F and 6G, when the user activates the modify replica & link policy hypertext 610, a user is given access to a replica policy window 660 and a link policy window 680. The replica policy window 660 allows the user to configure the replica policy for the replica volumes. For example, the user may determine the host operating system, reservation policy and be able to allow distribution of snapshots that are larger than a capacity of the journal volumes.

The link policy window 680 allows the user to configure the link policy for the replica volumes. For example, the user may determine if the protection type is asynchronous or synchronous, the RPO (Recover Point Objective) and bandwidth reduction settings.

Figure 6H:
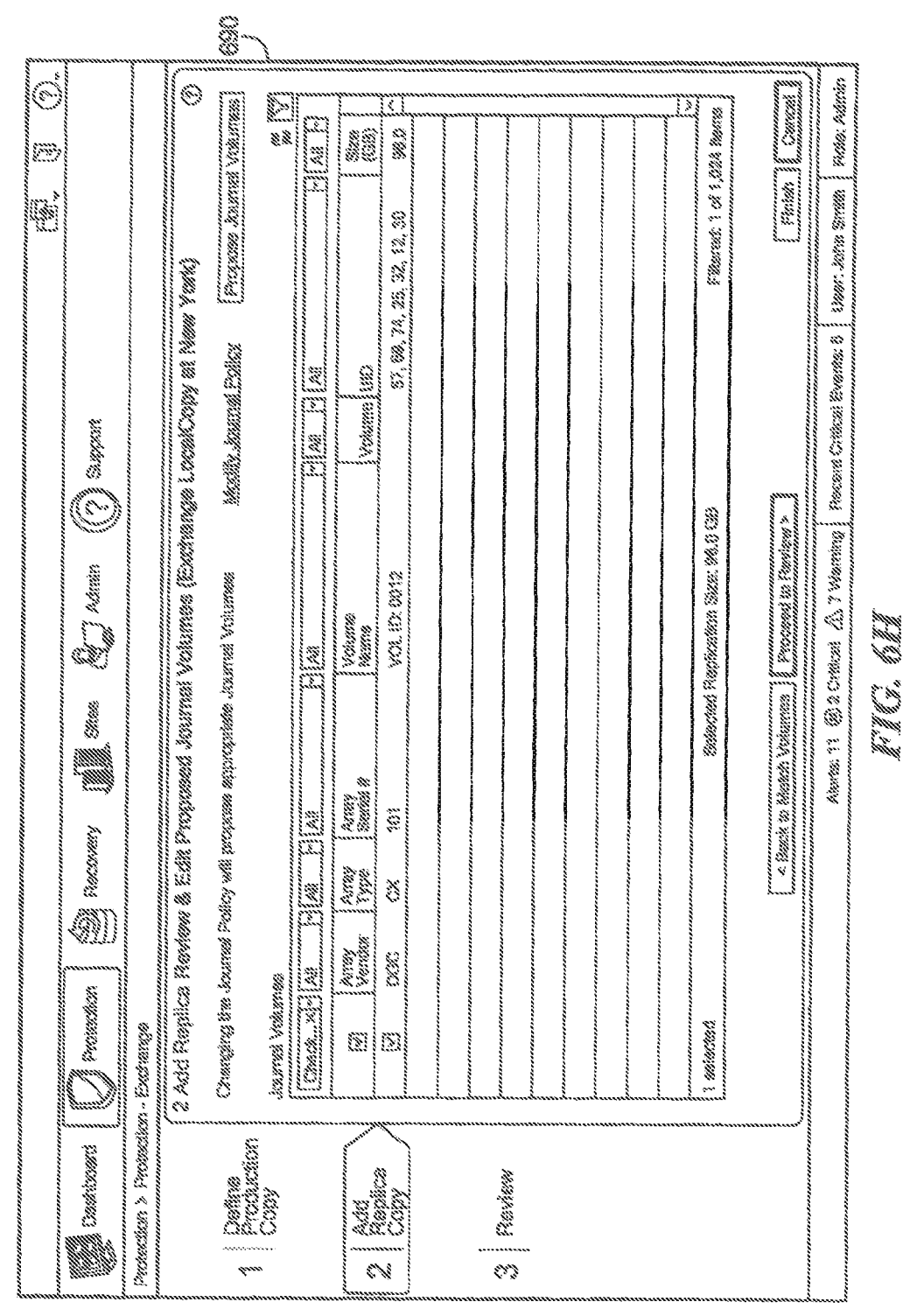

Referring to FIG. 6H, when the user activates the "proceed to review replica journal" button 632, the user is given access to a window 690 which allows the user to configure the journal policy similar to configuring the journal policy for the production volumes.

Figure 7:
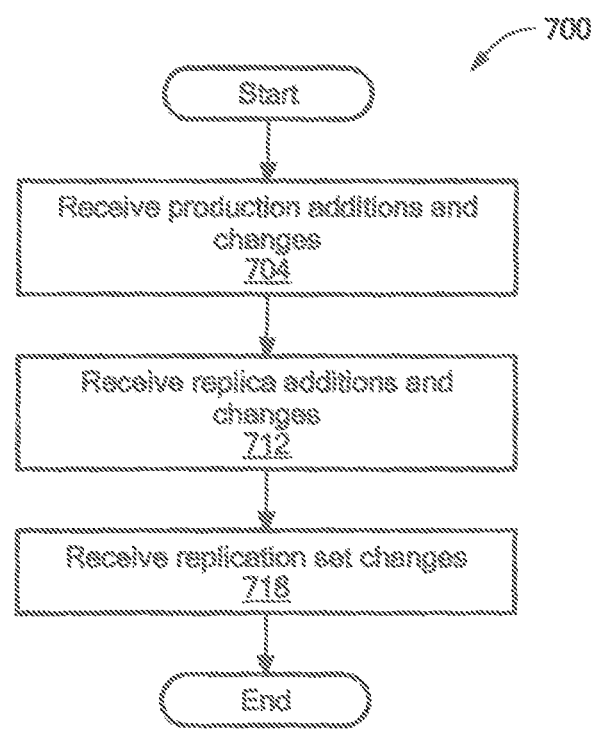
FIG. 7 is a flowchart of an example of a process to perform modifications on the data protection configuration.

Referring to FIG. 7, an example of a process to make modifications to the data protection configuration is a process 700. Process 700 receives productions changes and additions (704). For example, a user may changes the parameters of the production volumes. The user may also add additional production volumes. In one particular example, a user may change a replica to be a replica to one set of production volumes but be a set of production volumes to another replica.

Process 700 receives replica changes and additions (712). For example, a user may change the parameters of the replica. The user may also add additional replicas. In one particular example, a user may change a replica to be a replica to one set of production volumes but be a set of production volumes to another replica.

Process 700 receives replication set changes. For example, a user may configure which replicas and production volumes are included in a replication set and may modify the replication set to add or delete replicas or production volumes.

Figure 8A:
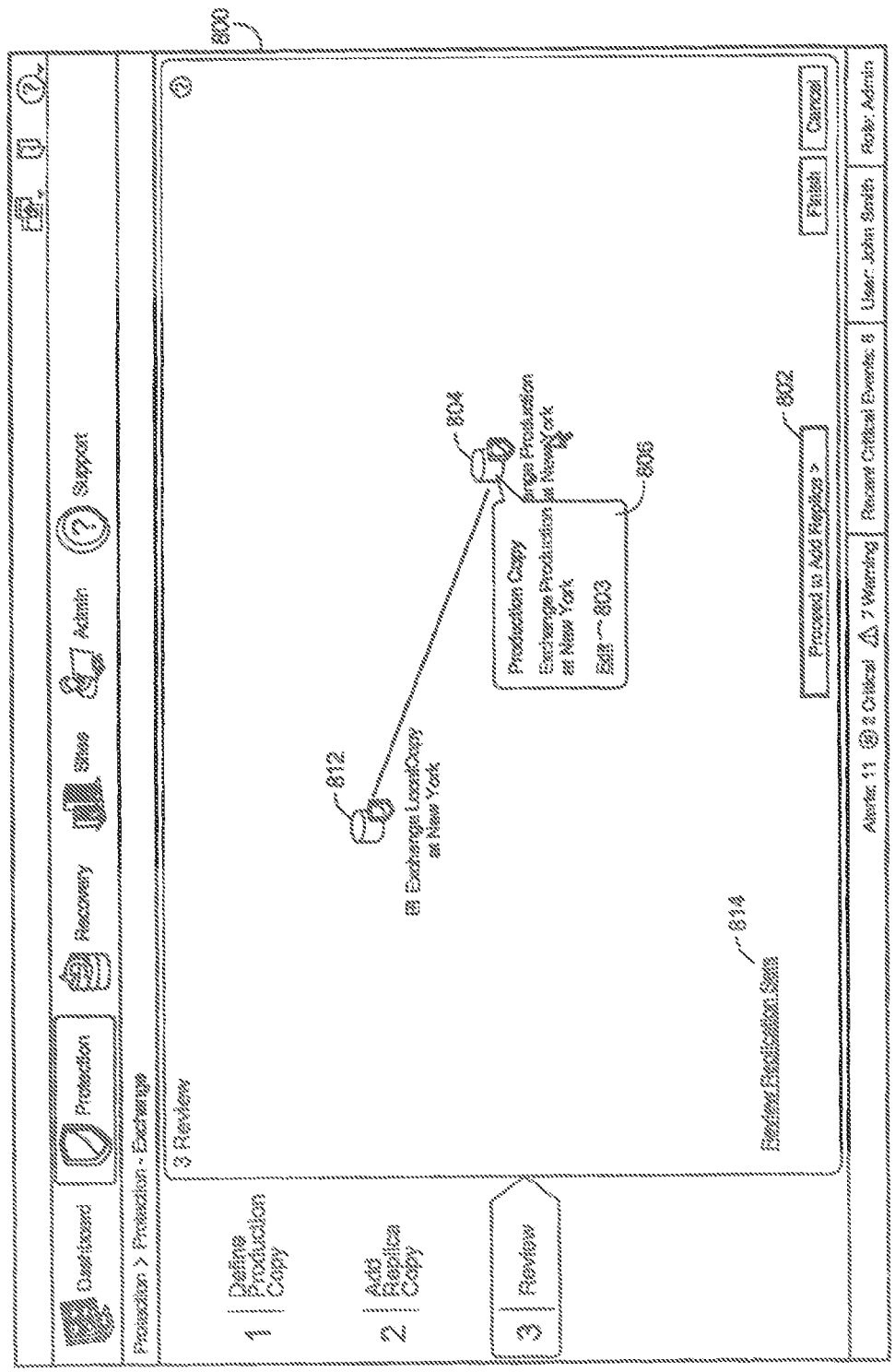

Referring to FIG. 8A, after performing the process 500 the user is given access to a window 800, which graphically presents a production copy icon 804 and a replica copy icon 812 for the user to select using a mouse for example to edit. For example, a window 806 appears after clicking on the production copy icon 804. The window includes an edit hypertext 803 that when activated by the user allows the user to edit the production copy. The window 800 also includes a "proceed to add replica" button 802 and a review replication sets hypertext 814.

Figure 8B:
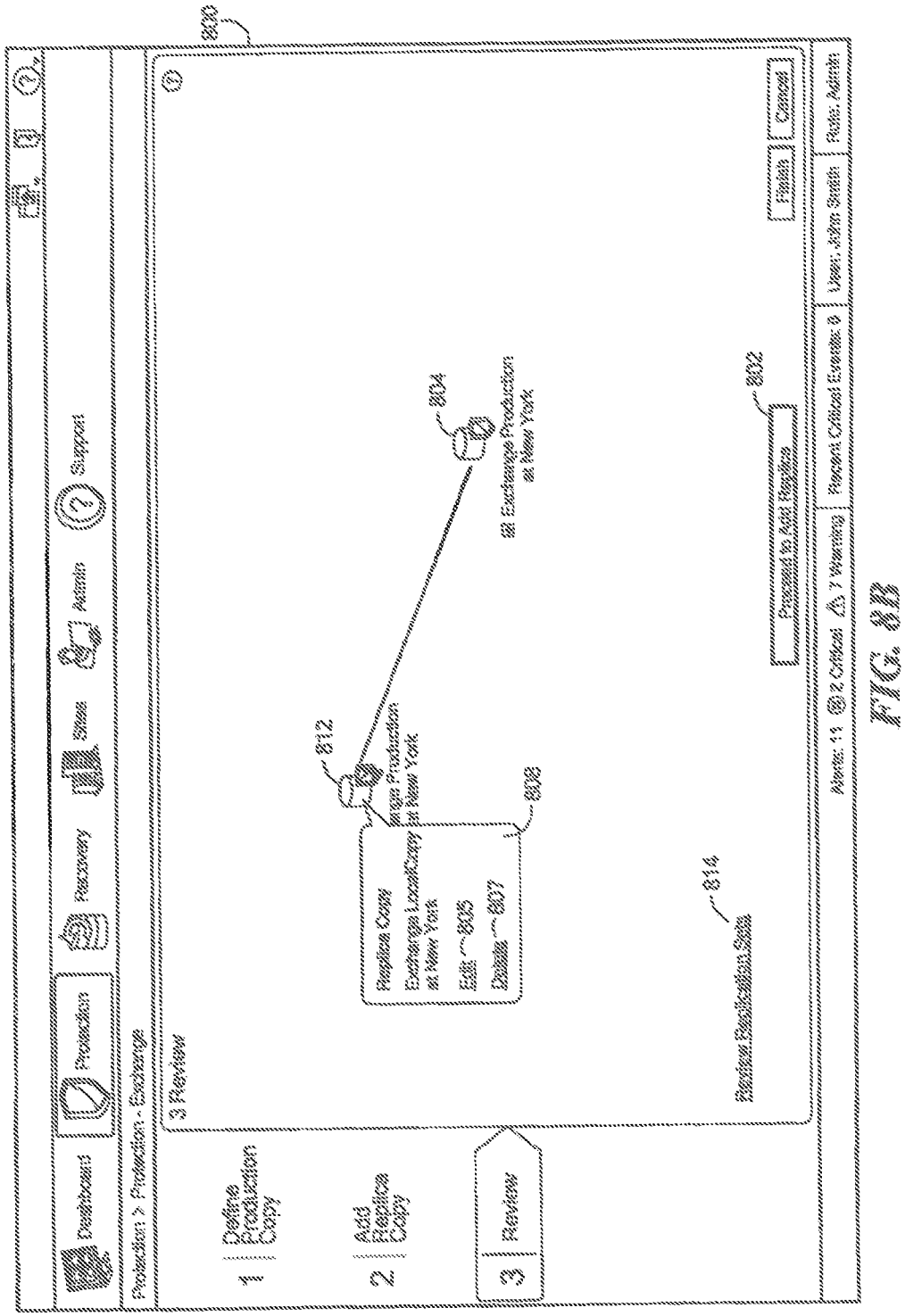

Referring to FIG. 8B, a window 808 appears after clicking on the production volumes icon 812. The window 800 includes an edit hypertext 805 that when activated by the user allows the user to edit the replica and a delete hypertext 807 that when activated by the user allows the user to delete the replica.

Figure 8C:
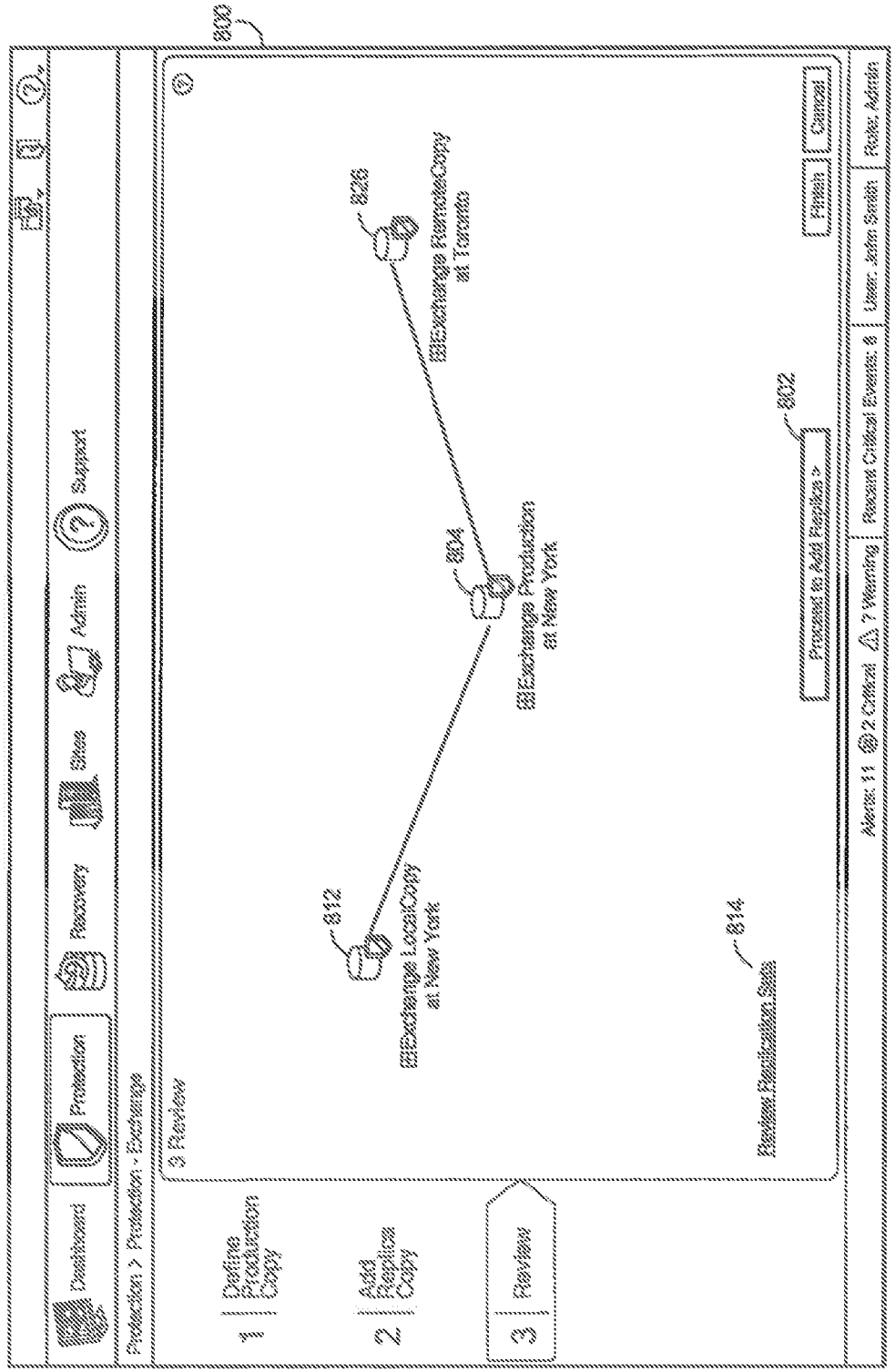

Referring to FIG. 8C, when a user activates the "proceed to add replica" button, the user is presented with windows similar to those windows used to add a replica in the process 500. After the replica copy is added an icon is also added to the window 800. For example, a replica copy icon 826 is added.

Figure 8D:
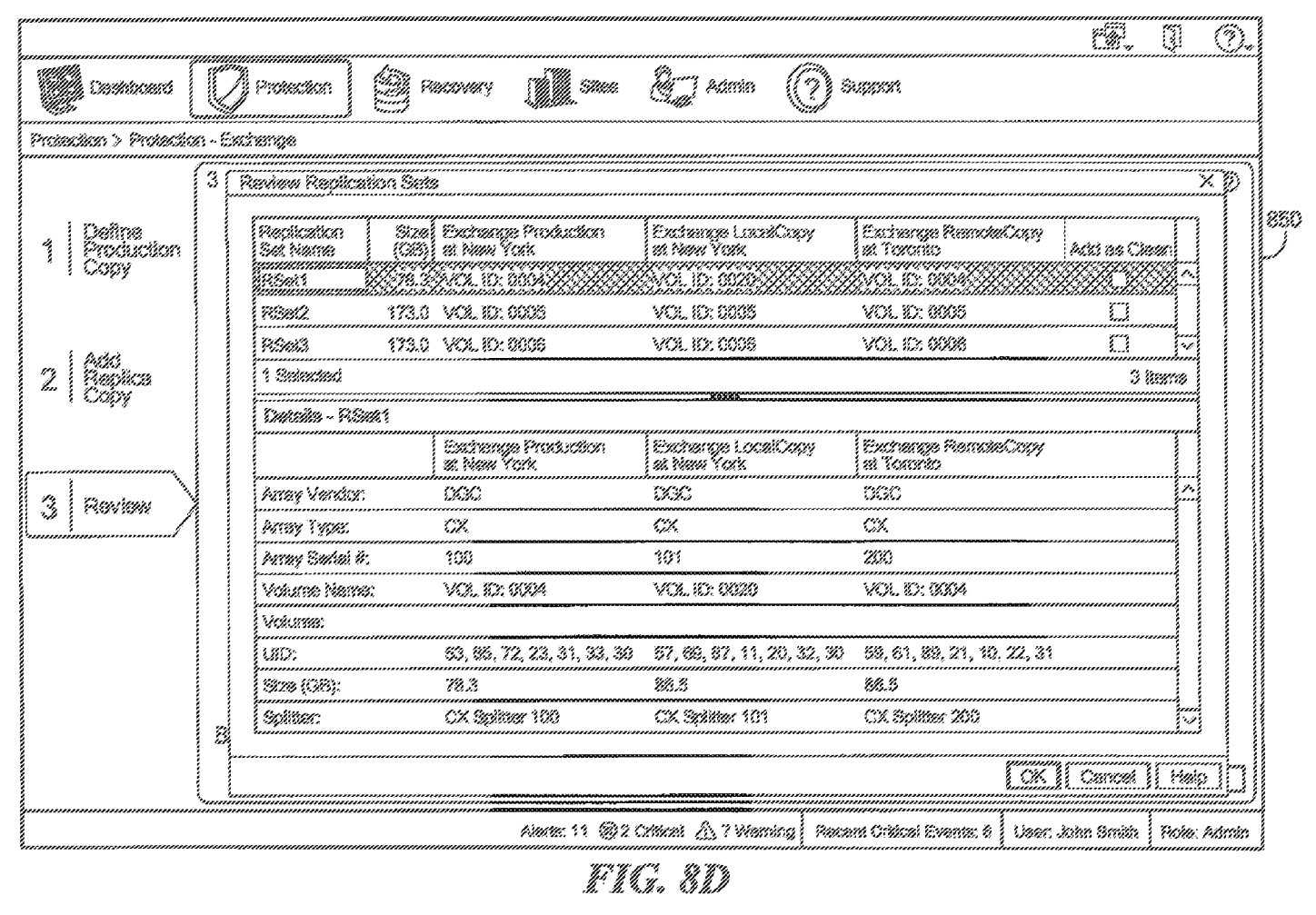

Referring to FIG. 8D, when a user activates the review replication sets hypertext 814 a user is given access to window 850. The window 850 allows the user to determine which replication sets include which production volumes and which replica volumes.

Referring to FIG. 9A to 9D, using the process 700 a user is able to set-up various production volumes and replicas configurations and combinations. For example, in FIG. 9A, production volumes node 902 is replicated at replica node 904. The volumes on the replica node 904 may be treated like production volumes and can also be replicated at a replica node 906. In another example, as shown in FIG. 9B, the replica node 904 may be replicated by more than one replica node, for example by the replica node 906 and a replica node 908. Thus, using the process 700 with the window 800 any replica or production node may be further expanded giving the user great flexibility in controlling the configuration of the data protection system.

In other examples, more than one production node (e.g., production nodes 922a-922c) may be sent to a single replica node (e.g., a replica node 924 (FIG. 9C)). In other examples, a set of production volumes may be replicated by more than one replica node (e.g., replica nodes 932a-932c (FIG. 9D)). In other examples, a first subset of the productions volumes are replicated at the replica node 932a, a second subset of production volumes are replicated at the replica node 932b and the remaining subset of production volumes are replicated at the replica node 932c.

Figure 10:
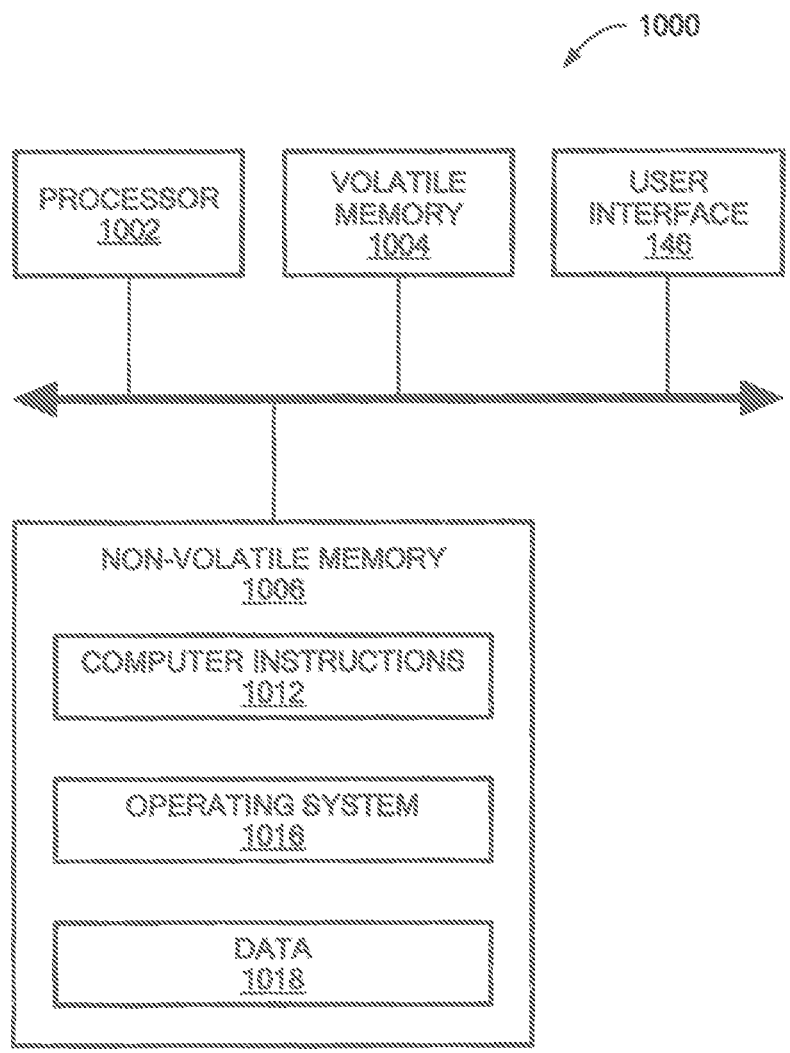
FIG. 10 is a computer on which the processes of FIGS. 2, 3, 5 and 7 may be implemented.

Referring to FIG. 10, in one example, a computer 1000 includes a processor 1002, a volatile memory 1004, a non-volatile memory 1006 (e.g., hard disk) and the user interface (UI) 146 (e.g., a graphical user interface, a mouse, a keyboard, a display, touch screen and so forth). The non-volatile memory 1006 stores computer instructions 1012, an operating system 1016 and data 1018. In one example, the computer instructions 1012 are executed by the processor 1002 out of volatile memory 1004 to perform all or part of the processes described herein (e.g., processes 200, 300, 500 and 700).

The processes described herein (e.g., processes 200, 300, 500 and 700) are not limited to use with the hardware and software of FIG. 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 300, 500 and 700 are not limited to the specific processing order of FIGS. 2, 3, 5, and 7, respectively. Rather, any of the processing blocks of FIGS. 2, 3, 5, and 7 may be re-ordered, combined or removed, performed in parallel or in serial, as necessary, to achieve the results set forth above.

The processing blocks (for example, in the processes 200, 300, 500 and 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Elements of different embodiments described herein may be combined to form other embodiments not specifically set forth above. Other embodiments not specifically described herein are also within the scope of the following claims.

What is claimed is:

1. A method comprising:
    rendering a user interface enabling a user to dynamically configure a production copy and a first replica copy of the production copy, the user interface further enabling a user to dynamically configure a second replica copy of the first replica copy;
    receiving a first set of inputs selected by a user using the user interface to configure the production copy;
    receiving a second set of inputs selected by the user using the user interface to configure the first replica copy of the production copy, wherein receiving the second set of inputs selected by the user using the user interface comprises receiving a second set of inputs comprising:
        an recover point objective (RPO) input enabling the user to select an RPO, the RPO being one of a system optimized lag or a maximum lag setting value entered by the user;
        a protection input enabling a user to select between asynchronous protection or synchronous protection;
        a match volumes input enabling the user to select which volumes to match for replication automatically and which volumes to manual match for replication;
        a replica policy input enabling the user to configure the replica policy for the replica volumes by selecting a host operating system, a reservation policy and distribution of snapshots that are larger than a capacity of journal volumes;
        a link policy input enabling the user to configure the link policy for the replica volumes by selecting if a protection type is asynchronous or synchronous, the RPO and bandwidth reduction settings; and
    configuring a data protection system to replicate the production copy at the first replica copy based on the first and second set of inputs.

2. The method of claim 1 wherein rendering the user interface comprises rendering a user interface enabling the user to:
    select a copy to manage, the copy comprising one of the replica copy or the production copy;
    add a new copy comprising adding a new production copy or a new replica copy; and
    define links to other copies comprising defining a link to at least a production copy or a replica copy.

3. The method of claim 1 wherein configuring the data protection system comprises configuring at least one replica copy to be replicated by another replica copy.

4. The method of claim 1 wherein configuring the data protection system comprises configuring more than one production copy to be replicated by a replica copy.

5. The method of claim 1 wherein configuring the data protection system comprises configuring the production copy to be replicated by more than one replica copy.

6. The method of claim 1 wherein receiving the first set of inputs selected by a user using the user interface to configure the production copy comprises receiving a first set of inputs comprising consistency group policy inputs comprising:
    a writes input enabling the user to select whether writes of a consistency group are distributed across more than one data protection appliance;
    a bandwidth input enabling the user to select a bandwidth of the consistency group with respect to other consistency groups; and
    a priority input enabling the user to select a priority of the consistency group with respect to the other consistency groups.

7. The method of claim 1, wherein the second set of inputs further comprises a journal policy input enabling a user to select a journal policy of the first replica copy of the production copy.

8. An article comprising:
    a non-transitory machine-readable medium that stores executable instructions, the instructions causing a machine to:
        render a user interface enabling a user to dynamically configure a production copy and a first replica copy of the production copy, the user interface further enabling a user to dynamically configure a second replica copy of the first replica copy;
        receive a first set of inputs selected by a user using the user interface to configure the production copy;
        receive a second set of inputs selected by the user using the user interface to configure the first replica copy of the production copy, wherein receiving the second set of inputs comprises:
            a recover point objective (RPO) input enabling the user to select an RPO, the RPO being one of a system optimized lag or a maximum lag setting value entered by the user;
            a protection input enabling a user to select between asynchronous protection or synchronous protection;
            a match volumes input enabling the user to select which volumes to match for replication automatically and which volumes to manual match for replication;
            a replica policy input enabling the user to configure the replica policy for the replica volumes by selecting a host operating system, a reservation policy and distribution of snapshots that are larger than a capacity of journal volumes;
            a link policy input enabling the user to configure the link policy for the replica volumes by selecting if a protection type is asynchronous or synchronous, the RPO and bandwidth reduction settings; and
        configure a data protection system to replicate the production copy at the first replica copy based on the first and second set of inputs.

9. The article of claim 8 wherein the instructions causing the machine to render the user interface comprises instructions causing the machine to render a user interface enabling the user to:
- select a copy to manage, the copy comprising one of the replica copy or the production copy;
- add a new copy comprising adding a new production copy or a new replica copy; and
- define links to other copies comprising defining a link to at least a production copy or a replica copy.

10. The article of claim 8 wherein the instructions causing the machine to configure the data protection system comprises instructions causing the machine to configure at least one replica copy to be replicated by another replica copy.

11. The article of claim 8 wherein the instructions causing the machine to configure the data protection system comprises instructions causing the machine to configure more than one production copy to be replicated by a replica copy.

12. The article of claim 8 wherein the instructions causing the machine to configure the data protection system comprises instructions causing the machine to configure the production copy to be replicated by more than one replica copy.

13. The article of claim 8 wherein the first set of inputs comprises consistency group policy inputs comprising:
- a writes input enabling the user to select whether writes of a consistency group are distributed across more than one data protection appliance;
- a bandwidth input enabling the user to select a bandwidth of the consistency group with respect to other consistency groups; and
- a priority input enabling the user to select a priority of the consistency group with respect to the other consistency groups.

14. An apparatus, comprising:
electronic hardware circuitry, the circuitry configured to:
- render a user interface enabling a user to dynamically configure a production copy and a first replica copy of the production copy, the user interface further enabling a user to dynamically configure a second replica copy of the first replica copy;
- receive a first set of inputs selected by a user using the user interface to configure the production copy;
- receive a second set of inputs selected by the user using the user interface to configure the first replica copy of the production copy, wherein receiving the second set of inputs comprises:
  - a recover point objective (RPO) input enabling the user to select an RPO, the RPO being one of a system optimized lag or a maximum lag setting value entered by the user;
  - a protection input enabling a user to select between asynchronous protection or synchronous protection;
  - a match volumes input enabling the user to select which volumes to match for replication automatically and which volumes to manual match for replication;
  - a replica policy input enabling the user to configure the replica policy for the replica volumes by selecting a host operating system, a reservation policy and distribution of snapshots that are larger than a capacity of journal volumes;
  - a link policy input enabling the user to configure the link policy for the replica volumes by selecting if a protection type is asynchronous or synchronous, the RPO and bandwidth reduction settings; and
- configure a data protection system to replicate the production copy at the first replica copy based on the first and second set of inputs.

15. The apparatus of claim 14 wherein the circuitry comprises at least one of a processor, a memory, programmable logic devices and logic gates.

16. The apparatus of claim 14 wherein the circuitry configured to render the user interface comprises circuitry configured to render a user interface enabling the user to:
- select a copy to manage, the copy comprising one of the replica copy or the production copy;
- add a new copy comprising adding a new production copy or a new replica copy; and
- define links to other copies comprising defining a link to at least a production copy or a replica copy.

17. The apparatus of claim 14 wherein the circuitry configured to configure the data protection system comprises circuitry configured to configure at least one replica copy to be replicated by another replica copy.

18. The apparatus of claim 14 wherein the circuitry configured to configure the data protection system comprises circuitry configured to configure more than one production copy to be replicated by a replica copy.

19. The apparatus of claim 14 wherein the circuitry configured to configure the data protection system comprises circuitry configured to configure the production copy to be replicated by more than one replica copy.

20. The apparatus of claim 14 wherein the first set of inputs comprises consistency group policy inputs comprising:
- a writes input enabling the user to select whether writes of a consistency group are distributed across more than one data protection appliance;
- a bandwidth input enabling the user to select a bandwidth of the consistency group with respect to other consistency groups; and
- a priority input enabling the user to select a priority of the consistency group with respect to the other consistency groups.

* * * * *